Feb. 15, 1927.    1,617,739
C. C. AVERILL
PROCESS FOR BREAKING WATER-IN-OIL EMULSIONS
Filed Nov. 21, 1925
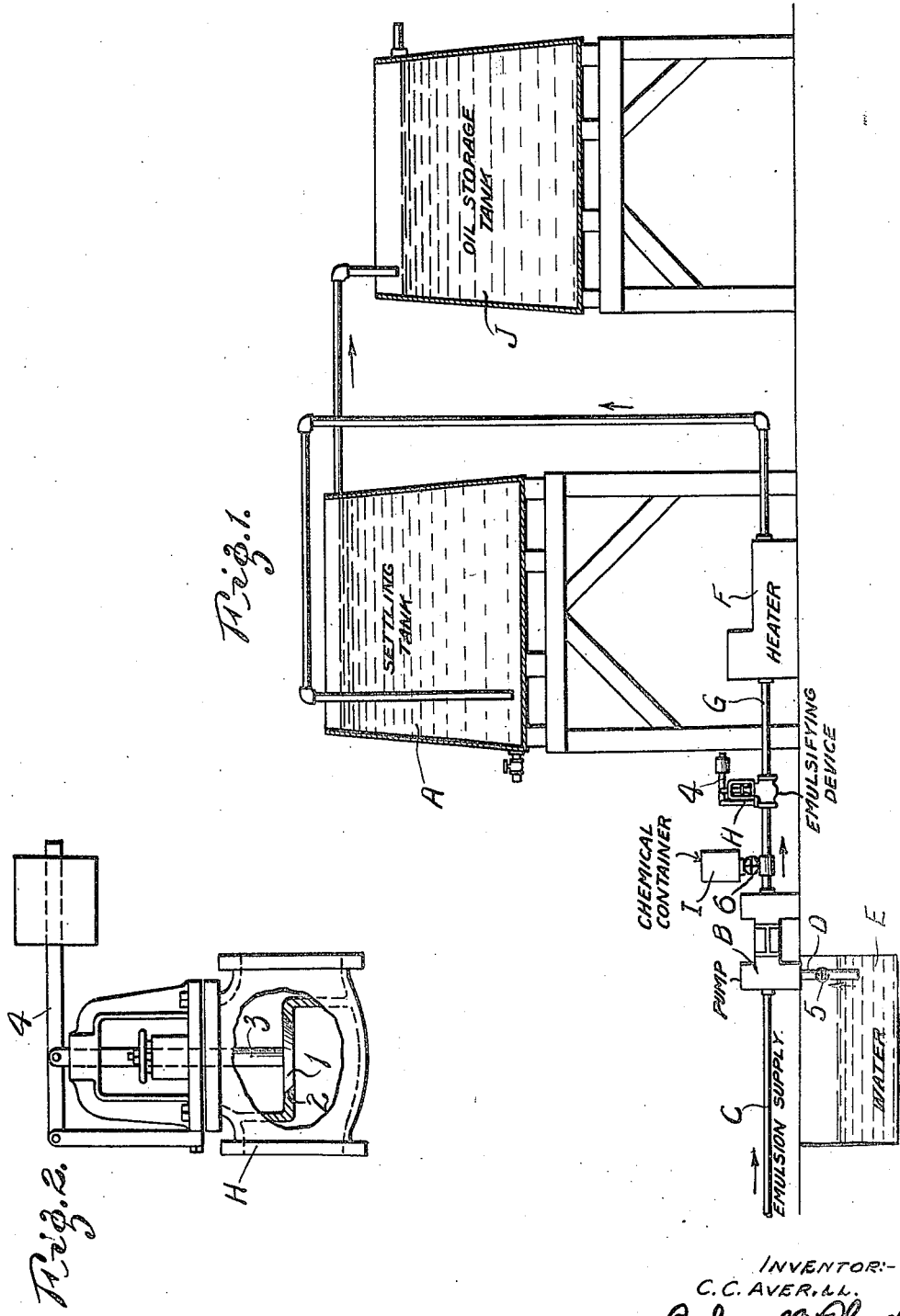
INVENTOR:-
C. C. AVERILL.
By Bakewell & Church
ATTORNEYS Patented Feb. 15, 1927.

1,617,739

UNITED STATES PATENT OFFICE.

CHARLES C. AVERILL, OF HOUSTON, TEXAS, ASSIGNOR TO WM. S. BARNICKEL & COMPANY, OF WEBSTER GROVES, MISSOURI, A CORPORATION OF MISSOURI.

PROCESS FOR BREAKING WATER-IN-OIL EMULSIONS.

Application filed November 21, 1925. Serial No. 70,538.

This invention relates to the treatment of emulsions of mineral oil and water, such as petroleum emulsions, for the purpose of separating the oil from the water.

Petroleum emulsions are of the water-in-oil type, and consist of oil constituting the continuous phase of the emulsions, droplets of water distributed throughout the body of oil and constituting the dispersed phase of the emulsion, and films of matter that encase the droplets of oil.

Emulsions of the kind above referred to which require treatment in the oil fields may be roughly divided into three separate and distinct classes:

1st. Temporary emulsions, which usually break when they are subjected to a moderate temperature and then allowed to remain in a quiescent state.

2nd. Emulsions which are sufficiently permanent to be unaffected by moderate heat alone, but which can be resolved or broken by the processes now generally used in the oil fields for treating petroleum emulsions, such as the chemical process, the boiling pit process, the electrical process and the centrifugal process; and 3rd. Obstinate or stubborn emulsions which ordinarily cannot be broken effectively or economically by one or the other of the conventional processes above referred to. The obstinate emulsions which make up this third class comprise "tank bottoms" or sediment that collects or builds up on the bottoms of oil storage tanks and which consist of oil mixed with colloidal sand, paraffin wax and other obnoxious solids in such proportions that the conventional processes used for breaking oil emulsions are either incapable of breaking them or are so expensive that they cannot be used commercially; "pit oils" which are obtained from earthen pits in which oil is stored when steel or wooden storage tanks are not available and which contain relatively great quantities of solids that stabilize the emulsion; "storage oils" which consist of oil emulsions that have been stored for long periods and which do not respond to treatment with conventional treating processes, due to the fact that age has made the emulsifying films practically impervious to the passage of the droplets of water or brine which said films encase; and "freak emulsions" which consist of freshly produced emulsions that contain enormous amounts of sand and other emulsifying material.

My invention relates to the treatment of stubborn or obstinate emulsions of the kind above referred to, and the object of the invention is to provide a process that will not only effectively break such stubborn emulsions, but which is inexpensive and capable of being practised or carried out in an apparatus of simple design that can be easily obtained in localities where such stubborn emulsions exist or are produced. This characteristic of being able to be practised with an inexpensive apparatus of simple design makes my process commercially feasible for use in oil fields and tank farms, because it is only at infrequent intervals that sediment is removed from the bottoms of oil storage tanks and only relatively small quantities of "tank bottoms" are obtainable in any particular locality; it is only in rare cases that "freak emulsions" are produced and it is only in rare cases that oil gushes from a producing well in such quantities that earthen pits have to be resorted to for storing the oil.

Briefly stated, my process consists in thoroughly mixing with a stubborn or obstinate emulsion of the kind above referred to, a quantity of water at least equal in volume to the amount of emulsion and sometimes equal in volume to three or four times the amount of the emulsion, and thereafter subjecting the emulsion to the action of a chemical demulsifying agent. The water that is added to the emulsion may be hard water, soft water, salty water or alkaline water, and heat is preferably employed to assist the treating agent or demulsifying agent to "break" the emulsion. Any suitable means can be employed to mix the water with the emulsion, but in most instances an emulsifying valve will be used to mix the water with the emulsion and sufficient water will be added so that the original emulsion cannot take up all this water as dispersed water, thus causing the excess water to tend to produce a distinctly different type of emulsion, to wit, an oil-in-water emulsion, in which the excess water constitutes the continuous phase and the oil of the original emulsion, plus the extra water which was dispersed into it, constitutes the dispersed phase. After the water has been added to the emulsion the temperature of said mixture is preferably raised and a chemical demulsifying agent is added to same so as to cause the emulsion to separate into its component parts, when it is allowed to stand in a quiescent state, the temperature to which the mixture is raised varying from 160° F. to 240° F.

The novelty of the above described process consists in the addition of excessive quantities of water to the emulsion prior to the chemical treatment as I have demonstrated that stubborn emulsions which could not be broken by a demulsifying agent and the addition of a moderate amount of water would respond to treatment and would break and separate into a clearly defined layer of oil and a layer of water or brine, when subjected to the treatment above described.

One example that I will cite of an emulsion which responded to treatment by my process but which failed to break when subjected to treatment by the conventional chemical treating process is an emulsion consisting of "tank bottoms" obtained from oil storage tanks at Texas City, Texas. Exhaustive tests made with this emulsion showed that the emulsion could not be broken with heat alone, or with heat and a moderate amount of water. Even when the emulsion was conditioned by heating it, adding a moderate amount of water and treating it with a chemical treating agent or demulsifying agent at a ratio of approximately 1 bbl. of treating agent to 2000 bbls. of emulsion, the emulsion failed to break. When, however, this same emulsion was conditioned according to my invention and also chemically treated with the same demulsifying agent at a ratio of approximately 1 bbl. of treating agent to 8,000 bbls. of emulsion, the emulsion broke and acceptable pipe line oil was recovered from same.

Conditioning or treatment of a stubborn emulsion, as above described, not only materially reduces the quantity of chemical treating agent or demulsifying agent that is required to produce a "break", but it also permits the use of chemical demulsifying agents which are too weak to be used economically in instances where the emulsion is not conditioned or subjected to treatment in accordance with my invention. For example, I can effectively break a stubborn emulsion by converting it into an oil-in-water emulsion, as above described, and treating it with a chemical demulsifying agent consisting of hydrophile emulsifying agents, such as unmodified glue, starch, gelatine, gum acacia and saponin capable of producing an oil-in-water emulsion. I have also found that such a conditioned emulsion can be broken when subjected to treatment with treating agents consisting of substances which of themselves are not hydrophile emulsifying agents, but which, in combination with the organic acidic material of the petroleum, such as naphthenic acids, tend to produce water-soluble salts, having the ability to emulsify oil in water. These substances include oil-soluble or water-soluble material having basic characteristics, such as caustic soda, soda ash, potash, sodium bicarbonate, ammonium hydrate, borax, sodium phosphate, aniline and pyridine.

Figure 1 of the drawings is a diagrammatic, side elevational view of an apparatus that can be used for practicing my process and Figure 2 is an enlarged side elevational view of the emulsifying device.

Referring to the drawings, A designates a tank that is adapted to hold the emulsion, after the water has been added to same, B designates a pump whose intake is connected with an emulsion pipe C that leads from a source of supply and also with a water pipe D that leads from a source of supply, such, for example, as a water pit E, F designates a heating device in the line G through which the mixture of emulsion and water is introduced into the tank A, H designates an emulsifying device arranged between the pump B and the heating device F, I designates a container that is used to hold a chemical treating agent or demulsifying agent which is introduced into the emulsion flowing into the tank A, and J designates a storage tank into which the clear or substantially clear oil is drawn from the tank A.

The emulsifying device H can consist of any suitable device or apparatus that will subject the emulsion and water to an emulsifying operation and cause the water to be thoroughly mixed with the emulsion. In the apparatus herein shown said emulsifying device H consists of a valve of the kind illustrated in Figure 2, which is so constructed or adjusted that the passage of the emulsion and water through said valve subjects said emulsion and water to a vigorous agitation, said valve comprising a tapered valve element 1 arranged with its peripheral edge spaced slightly away from a tapered valve seat 2 when the mixture is passing through the valve and having its stem 3 pivotally connected to a weighted lever 4 which holds the valve element 1 in adjusted position. The water supply pipe D that leads to the intake of the pump B is equipped with a valve 5 which is set so that an amount of water at least equal to the quantity of the emulsion that is drawn into the pump B will be added to and mixed with said emulsion. In some instances said valve 5 is set so that an amount of water equal to three or four times the amount of the emulsion will be added to the emulsion. In all cases sufficient water is added to the emulsion, so that the emulsion cannot take up all of this water as dispersed water, thereby causing the excess water to tend to produce an oil-in-water emulsion, as previously described. The mixture produced by the emulsion and the water drawn into the pump B is subjected to a temperature varying from 160° F. to 240° F., in passing through the heating device F. If desired the container I can be equipped with a valve 6 that can be closed so as to cut off communication between said container and the line G through which the water and emulsion enter the tank A. Normally the valve 6 is open so as to cause a chemical treating agent or demulsifying agent to pass from the container I into the line G, thus subjecting the emulsion to the action of a chemical demulsifying agent, as is the conventional chemical process for treating water-in-oil emulsions. It is immaterial whether the chemical demulsifying agent is introduced into the emulsion before or after the emulsion passes through the emulsifying device H, but in most instances the container I will be arranged in advance of said emulsifying device so as to cause the device H to produce emulsification and also thoroughly mix the chemical demulsifying agent with the emulsion.

Having thus described my invention, what I claim as new and desire to secure by Letters Patent is:

1. A process for breaking water-in-oil emulsions, characterized by adding to the emulsion an amount of water at least equal in volume to the quantity of the emulsion, subjecting said mixture to an emulsifying operation and also subjecting said mixture to the action of a chemical demulsifying agent which tends to cause the emulsion to break and separate into its component parts.

2. A process for breaking water-in-oil emulsions characterized by adding to the emulsion an amount of water at least equal in volume to the quantity of the emulsion and at least sufficient to be in excess of the amount of water which the emulsion can hold as dispersed water, subjecting said mixture to an emulsifying operation, and also subjecting said mixture to the action of a chemical demulsifying agent which tends to cause the emulsion to break and separate into its component parts.

3. A process for breaking water-in-oil emulsions, characterized by adding to an emulsion a quantity of water at least equal in volume to the quantity of the emulsion, subjecting said mixture to an emulsifying operation, heating the mixture and also subjecting the mixture to the action of a chemical demulsifying agent.

CHARLES C. AVERILL.